(12) United States Patent
Zhu (10) Patent No.: US 9,812,957 B2
(45) Date of Patent: Nov. 7, 2017

(54) DC/DC CONVERTER AND METHOD OF DRIVING DC/DC CONVERTER

(71) Applicant: THOMSON LICENSING, Issy les Moulineaux (FR)

(72) Inventor: Jiangbin Zhu, Beijing (CN)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 15/300,041

(22) PCT Filed: Mar. 28, 2014

(86) PCT No.: PCT/CN2014/074311
§ 371 (c)(1),
(2) Date: Sep. 28, 2016

(87) PCT Pub. No.: WO2015/143721
PCT Pub. Date: Oct. 1, 2015

(65) Prior Publication Data
US 2017/0155318 A1 Jun. 1, 2017

(51) Int. Cl.
*H02M 3/156* (2006.01)
*H02M 1/32* (2007.01)

(52) U.S. Cl.
CPC ............. *H02M 3/156* (2013.01); *H02M 1/32* (2013.01)

(58) Field of Classification Search
CPC ... H02M 2001/0022; H02M 2003/072; H02M 3/156; H02M 3/158
See application file for complete search history.

(56) References Cited

U.S. PATENT DOCUMENTS

| 5,831,418 A | 11/1998 | Kitagawa |
| 6,411,531 B1 | 6/2002 | Nork et al. |
| 8,212,541 B2 * | 7/2012 | Perreault ............... H02M 3/07 323/271 |
| 8,441,244 B2 | 5/2013 | Bianco et al. |

(Continued)

FOREIGN PATENT DOCUMENTS

| CN | 101765963 | 6/2010 |
| CN | 101854115 | 10/2010 |

(Continued)

*Primary Examiner* — Gary L Laxton
(74) *Attorney, Agent, or Firm* — Brian J. Dorini; Patricia A. Verlangieri (57) ABSTRACT

A DC/DC converter (100) includes a voltage conversion unit (20) having an input node to receive an input voltage and an output node to output an output voltage and configured to convert the input voltage to the output voltage to output the output voltage from the output node, and an electrical energy storage unit (GC2) including a first electrode to be a positive electrode and a second electrode to be a negative electrode. The first electrode is electrically connected to the input node of the voltage conversion converter. The DC/DC converter (100) further includes a switching unit (S1) configured to electrically connect the second electrode of the electrical energy storage unit to one of ground and the output node of the voltage conversion unit alternatively. The switching unit (S1) connects the second electrode of the electrical storage unit (GC2) to the output node when the input voltage is lower than a predetermined voltage.

15 Claims, 4 Drawing Sheets

(56) References Cited

U.S. PATENT DOCUMENTS

| | | | |
|---|---|---|---|
| 8,587,274 B2 | 11/2013 | Strydom et al. | |
| 9,136,795 B2* | 9/2015 | Liu | H02M 3/07 |
| 2007/0296383 A1 | 12/2007 | Xu et al. | |
| 2009/0230934 A1* | 9/2009 | Hooijschuur | H02M 3/1582 |
| | | | 323/282 |
| 2010/0188065 A1 | 7/2010 | Shiwaya | |
| 2010/0277152 A1* | 11/2010 | MacFarlane | H02M 3/07 |
| | | | 323/288 |
| 2012/0326513 A1 | 12/2012 | Chiu | |
| 2014/0266124 A1* | 9/2014 | Wang | H02M 3/07 |
| | | | 323/288 |
| 2014/0266132 A1* | 9/2014 | Low | H02M 3/07 |
| | | | 323/311 |

FOREIGN PATENT DOCUMENTS

| | | |
|---|---|---|
| CN | 101340148 | 7/2012 |
| CN | 102968170 | 3/2013 |
| CN | 103178711 | 6/2013 |
| CN | 103441669 | 12/2013 |
| EP | 1478083 | 11/2005 |
| FR | 2951837 | 4/2011 |
| JP | 4576022 | 11/2010 |
| WO | WO2005091112 | 9/2005 |

* cited by examiner

FIG.1

PRIOR ART

DC/DC CONVERTER AND METHOD OF DRIVING DC/DC CONVERTER

This application claims the benefit, under 35 U.S.C. §365 of International Application of PCT/CN2014/074311 filed Mar. 28, 2014, which was published in accordance with PCT Article 21(2) on Oct. 1, 2015.

TECHNICAL FIELD

The disclosed apparatus is related to a DC/DC converter and the disclosed method is related to a method of driving a DC/DC converter.

BACKGROUND ART

Conventionally, a step-down DC/DC (direct current to direct current) converter includes a capacitor between an input thereof and ground to input a direct voltage into the input.

Figure 1:
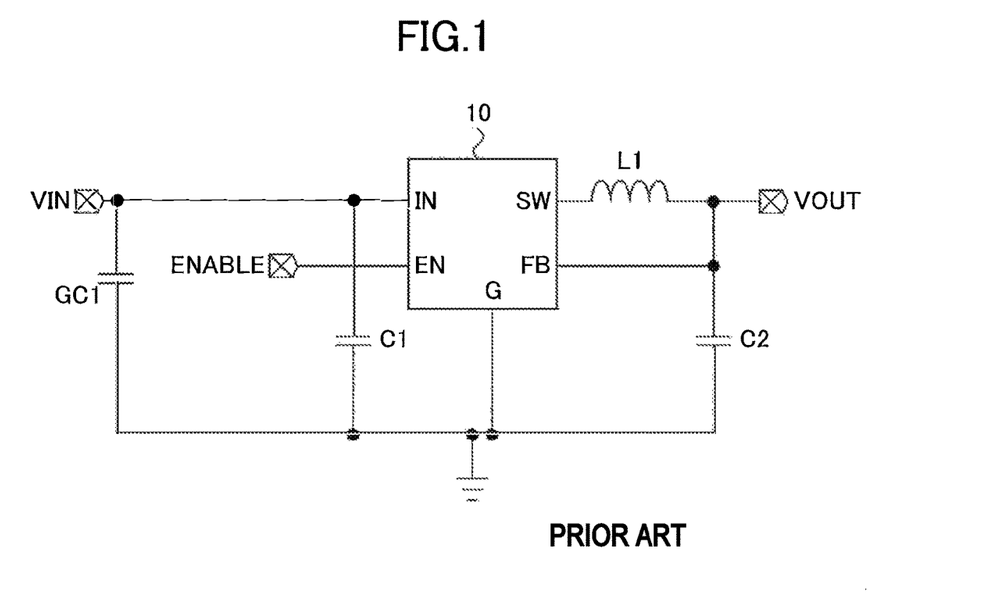
FIG. 1 is a drawing showing a circuit configuration of a typical conventional step down DC/DC converter.

FIG. 1 shows a circuit configuration of a typical conventional step-down DC/DC converter. Referring to FIG. 1, a capacitor GC1 is provided between an input VIN and ground. Accordingly, an input voltage is equal to a voltage of the capacitor GC1. When the input voltage is input into the input VIN, the conventional step-down DC/DC converter outputs a predetermined output voltage that is lower than the input voltage.

In the conventional step-down DC/DC converter shown in FIG. 1, the input voltage, which is the same as the voltage of the capacitor GC1 when electrical charge is fully stored in the capacitor, is higher than the output voltage to operate the DC/DC converter properly. In other words, in order to output the predetermined output voltage, the input voltage is higher than the predetermined output voltage. Moreover, to output the output voltage stably, the input voltage is required to be sufficiently higher than the output voltage.

In such a configuration, if the input voltage becomes close to the output voltage due to some accident such as a power outage, the output voltage output from the step-down DC/DC converter becomes unstable. In many cases, the output VOUT is connected to some electrical device including a CPU of a computer or the like. Accordingly, the DC/DC converter that cannot supply the output voltage when the input voltage is lower than the output voltage is not preferable because such an accident could sometimes happen for some reasons.

The capacitor GC1 supplies electric charges to an input terminal IN of a controller 10 to prevent from the decrease of the input voltage. However, as the voltage of the capacitor GC1 decreases, the DC/DC converter cannot supply the output voltage.

SUMMARY OF INVENTION

Embodiments of the present invention may provide a novel and useful DC/DC converter and a method of driving a DC/DC converter solving one or more of the problems discussed above.

According to an aspect of the present invention, there is provided a DC/DC converter that includes a voltage conversion unit having an input node to receive an input voltage and an output node to output an output voltage and configured to convert the input voltage to the output voltage to output the output voltage from the output node, and an electrical energy storage unit including a first electrode storing a positive charge and a second electrode storing a negative charge. The first electrode is electrically connected to the input node of the voltage conversion converter. The DC/DC converter further includes a switching unit electrically connected to the second electrode of the electrical energy storage unit and configured to electrically connect the second electrode of the electrical energy storage unit to one of ground and the output node of the voltage conversion unit alternatively. The switching unit is configured to connect the second electrode of the electrical storage unit to the output node when the input voltage is lower than a predetermined voltage.

According to another aspect of the present invention, there is provided a method of driving a DC/DC converter. In the method, a voltage conversion unit outputs a predetermined output voltage to an output node thereof by converting an input voltage input into an input node thereof. An electrical energy storage unit is connected to the input node of the voltage conversion unit and to ground through a switching unit and stores electrical energy thereinto. The switching unit is configured to electrically connect the electrical energy storage unit to one of the ground and the output node of the voltage conversion unit alternatively. The electrical energy storage unit is connected to the output node of the voltage conversion unit by a switching operation of the switching unit when the input voltage is lower than a predetermined threshold voltage.

BRIEF DESCRIPTION OF DRAWINGS

These and other aspects, features and advantages of the present invention will become apparent from the following description in connection with the accompanying drawings in which.

DESCRIPTION OF EMBODIMENTS

Hereinafter, embodiments of the present invention will be described referring to the drawings.

Figure 2:
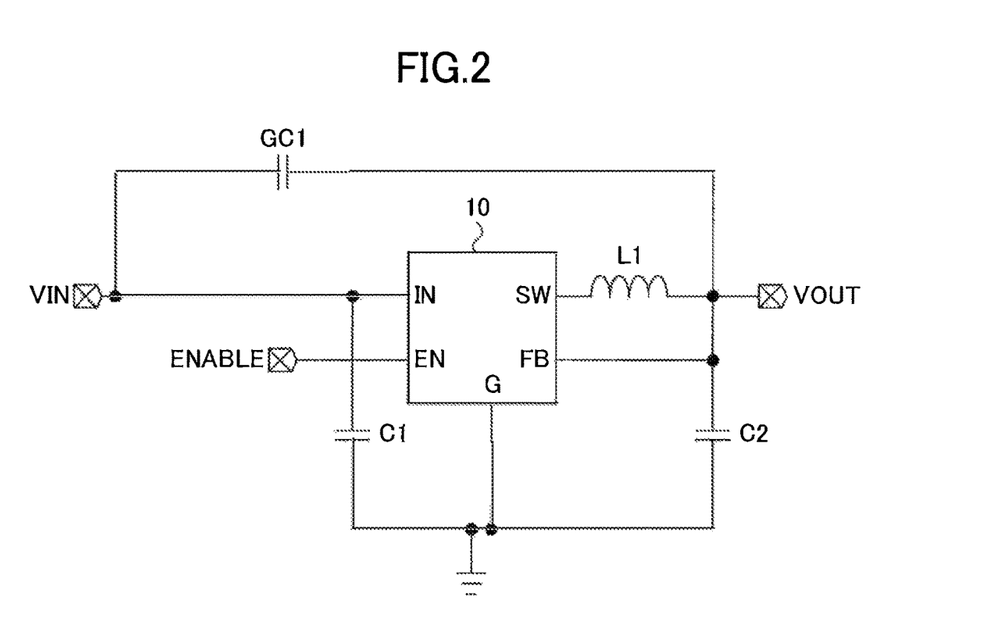
FIG. 2 is a schematic drawing for illustrating a general idea of embodiments of the present invention.

FIG. 2 is a schematic drawing for illustrating a general idea of embodiments of the present invention.

Referring to FIG. 2, an input voltage is input into an input terminal IN of a controller 10. A capacitor C1 is an input capacitor. When an enable signal is input into an enable terminal of the controller 10, the controller 10 operates and converts the input voltage to an output voltage. More specifically, the controller 10 outputs switching pulses of a predetermined duty cycle from a switching terminal SW to supply the switching pulses to an inductor L1. When the switching pulse is a high-level voltage, the inductor L1 stores electrical energy by receiving a direct current flowing into the inductor L1, and when the switching pulse is a low-level voltage, the inductor L1 is likely to keep the direct current flowing by generating an electromotive force, which is output as an output voltage and causes a capacitor C2 to have the same voltage as the output voltage. The output voltage is monitored by the controller 10 through a feedback terminal thereof that is connected to the positive side of the capacitor C2, and the duty cycle of the switching pulses is controlled to keep the output voltage a predetermined value.

By moving the capacitor GC1 from the location between the ground and the input VIN to the location between the input VIN and the output VOUT, the voltage of the input VIN becomes higher than the voltage of the output VOUT because the voltage of the capacitor GC1 is added to the voltage of the output VOUT. More specifically, with respect to the voltages of the input VIN, the capacitor GC1, and the output VOUT, the following formula is completed.

$$VIN=VOUT+VB1(VB1 \text{ is the voltage of capacitor } GC1)$$

Accordingly, the voltage of the capacitor GC1 is not required to be higher than the voltage of the input VIN. Hence, the capacitor GC1 can continue to supply power even if the voltage of the capacitor GC1 is lower than the voltage of the output VOUT. This can improve power efficiency of the electric energy stored in the capacitor GC1. In the following embodiments, such an idea is applied to more detailed examples. Here, such a capacitor is used during power failure, in which the period is called a "dying gasp" period, and the capacitor is called a "dying gasp capacitor." In the following description, such a capacitor may be called the dying gasp capacitor.

First Embodiment

Figure 3:
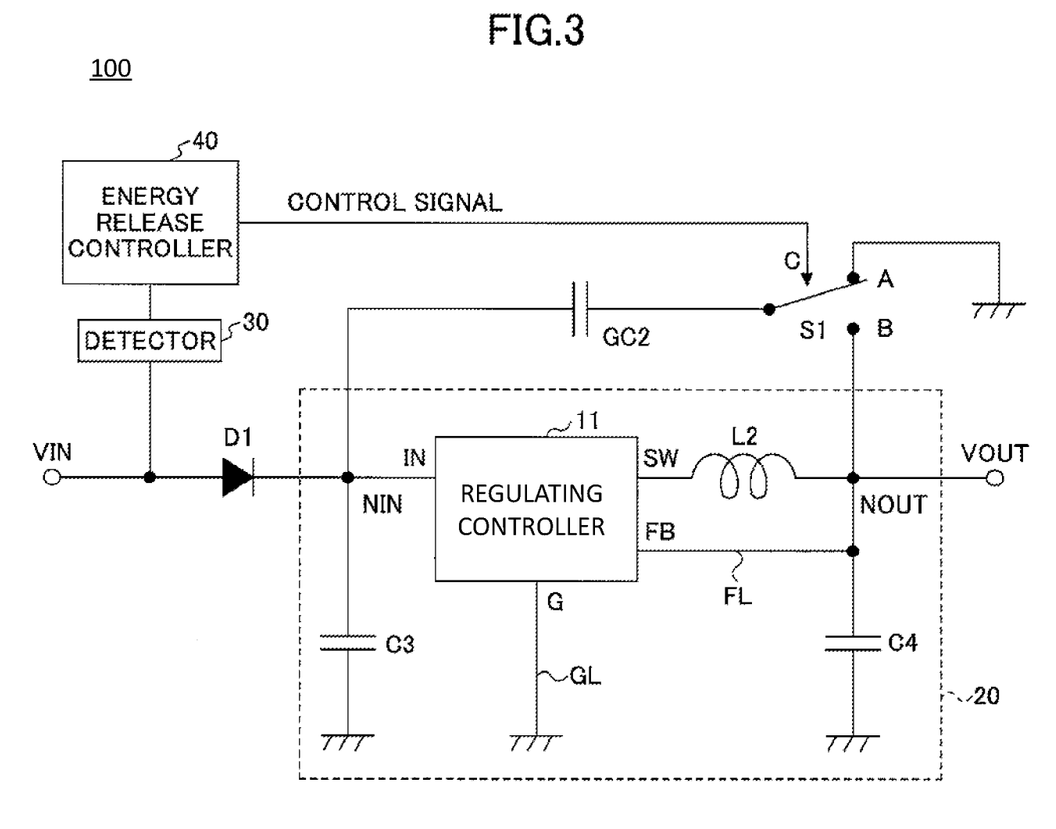
FIG. 3 is a drawing illustrating a circuit configuration of a DC/DC converter according to a first embodiment of the present invention.

FIG. 3 is a drawing illustrating a circuit configuration of a DC/DC converter according to a first embodiment of the present invention.

Referring to FIG. 3, the DC/DC converter 100 of the first embodiment is configured to be a DC/DC step-down converter to convert an input DC (direct-current) voltage to an output DC voltage that is lower than the input voltage. The DC/DC converter 100 has an input VIN to receive the input DC voltage from the outside of the DC/DC converter 100 and an output VOUT to output and apply the output DC voltage to an electric load connected to the output VOUT. The DC/DC converter 100 includes a voltage conversion unit 20, a capacitor GC2, and a switching unit S1.

The voltage conversion unit 20 has an input node NIN and an output node NOUT. The input node NIN is a connection point of a cathode of a diode D1, an electrode of a capacitor C3, and an electrode of the capacitor GC2. The input node NIN is electrically connected to the input VIN of the DC/DC converter 100 to receive an input voltage from the input VIN of the DC/DC converter 100. Usually, a voltage value of the input VIN of the DC/DC converter 100 is the same as the power-supply voltage. In other words, the voltage line of the input VIN is the power-supply line. Accordingly, the voltage value of the input node NIN is the same as the power-supply voltage when the voltage conversion unit 20 works normally.

The output node NOUT is a connection point of an end of an inductor L2, an electrode of a capacitor C4, a feedback terminal of a regulating controller 11, a switching unit S1, and the output VOUT of the DC/DC converter 100. The voltage conversion unit 20 outputs the converted voltage to the output node NOUT as the output voltage of the voltage conversion unit 20, and then the output voltage is output from the output VOUT without any change as the output voltage of the DC/DC converter 100. In other words, the output node NOUT and the output VOUT are on a voltage line to output the output voltage converted by the voltage conversion unit 20. In normal operation, a predetermined output voltage is output from the output VOUT.

The output VOUT is usually connected to an electric load of some electric device including a CPU (Central Processing Unit) of a computer or the like. In other words, the voltage conversion unit 20 is normally used to supply the predetermined voltage to the electric load. In many cases, because the electric load includes a CPU, if the output voltage suddenly drops in a very short time, the CPU cannot properly complete shutdown procedures such as data saving. Accordingly, even if the input voltage drops, the DC/DC converter 100 is preferred to have a function of continuing to supply the electrical power to the electric load until the CPU of the electric load finishes the shutdown procedure after the input voltage drops.

The capacitor GC2 works as an electrical energy storage unit to store electrical energy to supply the electrical energy to the voltage conversion unit 20 when the input voltage drops. In other words, the capacitor GC2 is so-called a dying gasp capacitor. One electrode of the capacitor GC2 is electrically connected to the input node NIN of the voltage conversion unit 20. The electrode of the capacitor GC2 electrically connected to the input node NIN retains a positive charge therein as a positive electrode. Accordingly, when the input voltage drops, the capacitor GC2 can supply the electrical power stored therein to an input terminal of the regulating controller 11 through the input node NIN. At this time, the diode D1 works to prevent a current flowing from the capacitor GC2 from flowing to the input VIN as a back-flow prevention diode.

The switching unit S1 is a switching device configured to electrically connect the other electrode of the capacitor GC2 to one of ground and the output node NOUT alternatively. In FIG. 3, the switching unit S1 has a contact A connected to ground and a contact B connected to the output node NOUT. By switching between the contact A and the contact B, the other electrode of the capacitor GC2 is connected to ground or the output node NOUT. The switching operation of the switching unit S1 may be controlled by an energy release controller 40 (which may be also called just a "controller"). For example, the energy release controller 40 controls the switching operation of the switching unit S1 by sending a control signal to the switching unit S1. Here, the control signal includes a non-signal state because a state of receiving a signal and a state of not receiving a signal are distinguishable for the switching unit S1.

The switching unit S1 may be made of a semiconductor switching device such as a bipolar transistor, a MOS (Metal Oxide Semiconductor) transistor, or a CMOS (Complementary Metal Oxide Semiconductor) transistor. For example, the energy release controller 40 can control the switching operation by sending a high-level voltage or a low-level voltage to a gate of the MOS transistor when the MOS transistor is used as the switching unit S1.

When the input voltage is normal, the switching unit S1 electrically connects the other electrode(negative side) of the capacitor GC2 to ground (contact A). By doing this, the voltage value equal to the input voltage (which is expresses as a Vi here) of the input node NIN is applied between both electrodes of (or across) the capacitor GC2, and the capacitor GC2 stores electrical charge (=CVi) and energy (=(1/2)CVi$^2$) therein corresponding to the input voltage Vi.

In contrast, when the input voltage drops, the switching unit S1 electrically connects the other electrode of the capacitor GC2 to the output node NOUT (contact B). By doing this, the input voltage Vi of the capacitor GC2 is added to the output voltage (which is expressed as Vo here) of the output node NOUT, and results in (Vi+Vo). Accordingly, the capacitor GC2 can use its stored electrical energy efficiently. More specifically, the capacitor GC2 can continue to supply a current to the terminal IN of the regulating controller 11 through the input node NIN for a period longer than the conventional DC/DC converter 100 because the electrical energy stored in the capacitor GC2 can be fully used to supply the current to the input node NIN.

The DC/DC converter 100 may include a voltage detector 30. The voltage detector 30 may be electrically connected to the input VIN of the DC/DC converter 100 and the anode of the diode D1. The voltage detector 30 may be one of various kinds of voltage detection units as long as the voltage detector 30 can detect the input voltage of the input VIN. For example, the voltage detector 30 may include a voltage dividing circuit electrically connected to the input VIN and a measurement unit to calculate the input voltage from a divided voltage value detected by the voltage dividing circuit. The measurement unit of the voltage detector 30 may be incorporated into the energy release controller 40.

The energy release controller 40 is made of an electric circuit or a CPU. The energy release controller 40 determines whether electrical connection of the other electrode of the capacitor GC2 should be switched from the connection with ground (contact A) to the connection with the output node NOUT (contact B) based on the input voltage detected by the voltage detector 30. The energy release controller 40 may determine whether the other electrode of the capacitor GC2 should be connected to the output node NOUT (contact B) based on a predetermined threshold voltage. More specifically, for example, when a threshold voltage is preliminarily set, the energy release controller 40 may determine that the other electrode of the capacitor GC2 should be connected to the output node NOUT (contact B) in response to a signal from the voltage detector 30 indicating that the input voltage Vi is lower than the predetermined threshold voltage.

The threshold voltage may be arbitrarily set, considering a proper timing when the electrical energy stored in the capacitor GC2 should be released. In general, the threshold voltage may be set at a certain value higher than a lower limit in a regular range of the input voltage determined by the power-supply voltage for safety. However, if there is a case where releasing the stored electrical energy at a late stage is enough, the threshold voltage may be set at a certain voltage value equal to or lower than the lower limit of the regular range of the input voltage. Thus, the threshold voltage may be set at any appropriate value for intended purpose.

The diode D1 is inserted between the voltage detector 30 and the input node NIN, and whose anode is connected to the voltage detector 30 and whose cathode is connected to the input node NIN. The diode D1 prevents the current from the capacitor GC2 from flowing into the voltage detector 30, and causes the current from the capacitor GC2 to flow toward the terminal IN of the regulating controller 11.

The voltage conversion unit 20 converts the input voltage Vi at the input node NIN to the output voltage and outputs the converted output voltage to the output node NOUT. The voltage conversion unit 20 includes the capacitor C3, the regulating controller 11, an inductor L2, a capacitor C4, a feedback line FL, and a ground line GL.

The regulating controller 11 is configured to supply switching pulses to the inductor L2. The regulating controller 11 has at least four terminals, including the input terminal IN, a switching terminal SW, a feedback terminal FB and a ground terminal G. The input terminal IN receives the input voltage Vi input from the input node NIN. The regulating controller 11 generates switching pulses from the input voltage. For example, the regulating controller 11 may contain a semiconductor switching device such as a bipolar transistor, a MOS transistor and the like (not shown in FIG. 3) to create the switching pulses. The switching pulses are output from the switching terminal SW of the regulating controller 11 and are supplied to the inductor L2. When the switching pulse is a high-level voltage, the inductor L2 stores electrical energy by a current flowing from the switching terminal SW to the output node NOUT, and when the switching pulse is a low-level voltage, the inductor L2 generates a back electromotive force causing the current to continue to flow from the switching terminal SW to the output node NOUT, by which the output voltage is output to the output node NOUT. The capacitor C4 is inserted between the output node NOUT and ground to remove noise from the output voltage Vo. The output node NOUT is electrically connected to the feedback terminal FB through the feedback line FB. Hence, the output voltage Vo at the output node NOUT is monitored by the regulating controller 11, and the regulating controller 11 adjusts a duty cycle of the switching pulses so as to keep the output voltage Vo constant, the predetermined voltage, based on the monitored output voltage Vo. The regulating controller 11 is also connected to ground through the ground terminal G and the ground line GL. The regulating controller 11 may contain a diode (not shown in the drawing) whose anode is connected to the ground terminal G and whose cathode is connected to the input voltage line within the regulating controller 11.

The capacitor C3 is an input capacitor, and is used to remove noise from the input voltage Vi as a smoothing capacitor.

Next, a more detailed description is given below of operation of the DC/DC converter 100. Firstly, when receiving an input voltage from the input VIN, the voltage detector 30 detects a voltage value of the input voltage. The voltage detector 30 sends a detection signal indicating the detected input voltage value to the energy release controller 40. When the input voltage value is equal to or higher than a predetermined threshold voltage, the energy release controller 40 sends a control signal to the switching unit S1 to cause the switching unit S1 to connect the negative side of the capacitor GC2 to the contact A connected to ground. By doing this, the input voltage at the input node NIN that is the same as the input voltage at the input VIN is applied to the capacitor GC2. The GC2 stores the electrical energy corresponding to the input voltage, and this state continues as long as the input voltage detected by the voltage detector is equal to or higher than the threshold voltage.

When the voltage detector 30 detects an input voltage lower than the predetermined threshold value, the energy release controller 40 sends a control signal to the switching unit S1 to cause the switching unit S1 to connect the negative side of the capacitor GC2 to the contact B connected to the output node NOUT. By doing this, the capacitor GC2 release the electrical energy stored therein and a current from the capacitor GC2 flows into the input terminal IN of the regulating controller 11 through the input node NIN. Because the voltage of the capacitor GC2 is higher than the voltage at the output node NOUT, the electrical energy can be fully supplied to the regulating controller 11.

As described above, according to a DC/DC converter 100 of the first embodiment, electrical energy stored in a dying gasp capacitor can be used efficiently for a dying gasp period.

Second Embodiment

Figure 4:
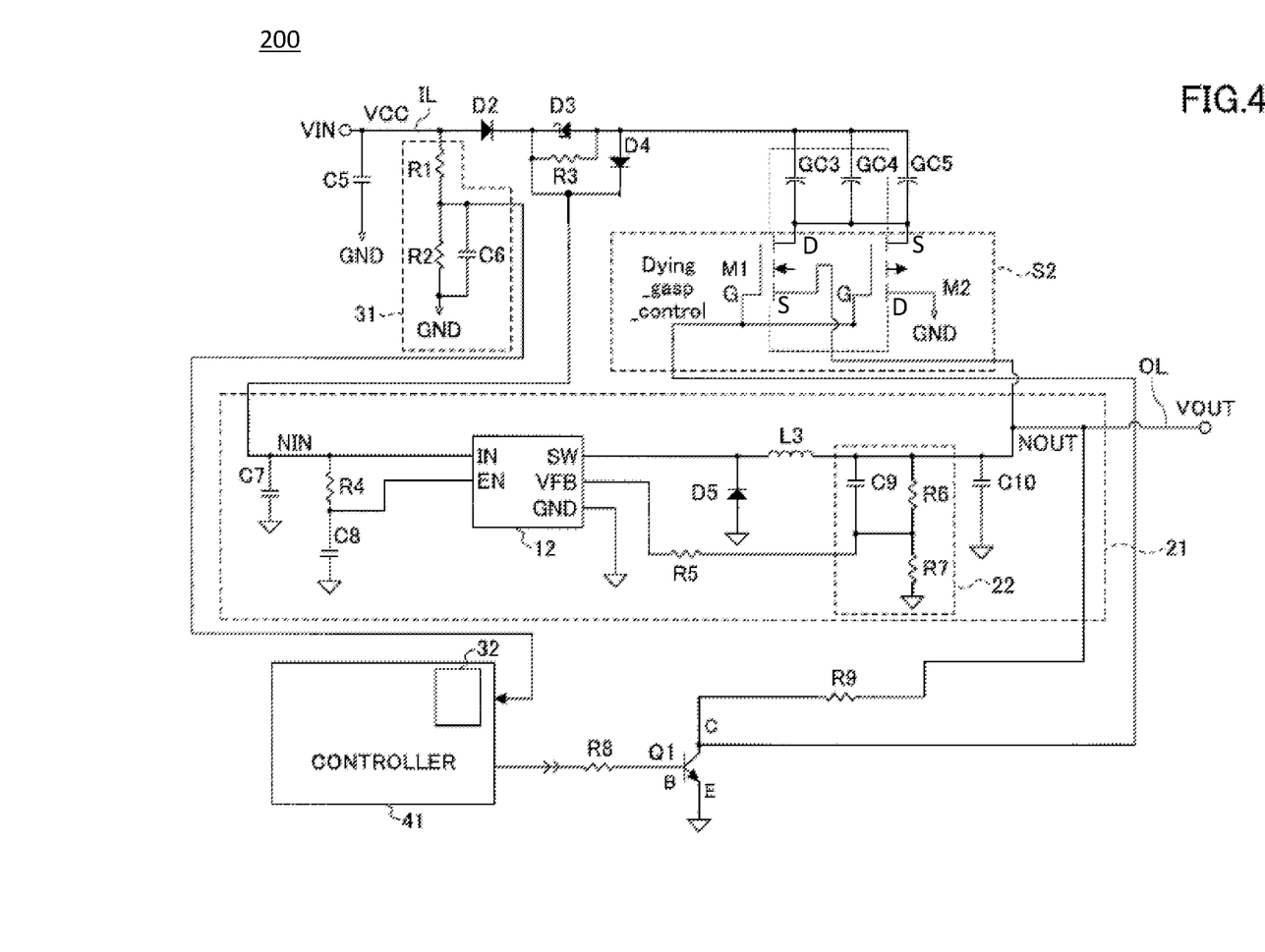
FIG. 4 is a drawing illustrating a circuit configuration of a DC/DC converter according to a second embodiment of the present invention.

FIG. 4 is a drawing illustrating a circuit configuration of a DC/DC converter according to a second embodiment of the present invention.

Referring to FIG. 4, the DC/DC converter 200 of the second embodiment includes an input VIN, an input line IL, a capacitor C5, a dividing circuit 31, diodes D2 through D4, a resistor R3, capacitors GC3 through GC5, a switching unit S2, a voltage conversion unit 21, an energy release controller 41, resisters R8 and R9, an output line OL, and an output VOUT.

In the second embodiment, a description is given below by providing specified input and output voltages as an example. More specifically, an input voltage is set at 12V, and the input voltage is the same as a power-supply voltage VCC similarly to the first embodiment. An output voltage is set at 7.7V. Although the input voltage and the output voltage are not limited to these values in the second embodiment, since it is easy to understand the embodiment if there are specified values as an example, the above voltage values are provided as the example for convenience of explanation. Because the input line IL is substantially the same as the power-supply line VCC, the input line may be also called the power-supply line VCC.

The capacitor C5 is provided between ground and the input VIN and electrically connected thereto. The capacitor C5 is a smoothing capacitor to remove noise from the input voltage.

The voltage dividing circuit 31 is provided to detect the input voltage. The voltage dividing circuit 31 includes resisters R1 and R2, which are electrically connected in series to each other and inserted between the input line IL and ground and electrically connected thereto. An electrode of a capacitor C6 is electrically connected between the resisters R1 and R2, and the other electrode is connected to ground, in parallel with the resistor R2.

The high voltage side of the resistor R2 and the capacitor C6 is electrically connected to a voltage detection unit 32 in the energy release controller 41. The voltage detection unit 32 measures a divided voltage value of the resistor R2, and detects the voltage value of the input voltage based on the divided voltage value. The voltage dividing circuit 31 and the voltage detection unit 32 constitute a voltage detector corresponding to the voltage detector 30 in the first embodiment in FIG. 3. Thus, a part of the voltage detector may be incorporated in the energy release controller 41.

For example, when the voltage detector constituted of the voltage dividing circuit 31 and the voltage detection unit 32 detects that the input voltage is lower than a predetermined threshold voltage, dying gasp control can be performed. In this regard, a detailed description is given later.

The diode D2 is a backflow prevention diode, which corresponds to the diode D1 in FIG. 3. The anode of the diode D2 is electrically connected to the input VIN and the voltage dividing circuit 31, and prevents a current flowing from dying gasp capacitors (the capacitors GC3 through GC5) from flowing into the voltage dividing circuit 31 to prevent an input voltage detection error.

The diode D3, the resistor R3 and the diode D4 constitute a protection circuit. The diode D3 is a Schottky-barrier diode, and its cathode is electrically connected to the cathode of the diode D2 and the input node NIN, and its anode is electrically connected to the dying gasp capacitors GC3 through GC5. The resister R3 is connected to the diode D3 in parallel. The anode of the diode D4 is electrically connected to the anode of the diode D3, the resister R3 and the dying gasp capacitors GC3 through GC5, and the cathode of the diode D4 is connected to the cathode of the diode D3, the resister R3 and the input node NIN. When the input current from the input VIN flows into the dying gasp capacitors GC3 through GC5 to cause the dying gasp capacitors GC3 through GC5 to store electrical energy, because the current flows through the resistor R3 due to the diodes D3 and D4, the current does not suddenly flow into the dying gasp capacitors GC3 through GC5 even if the current is high such as a surge current.

The capacitors GC3 through GC5 are so-called dying gasp capacitors provided for dying gasp operation. In FIG. 4, three of the capacitors GC3 through GC5 are electrically connected to the input line IL in parallel. More specifically, one electrode of each of the capacitors GC3 through GC5 is electrically connected to the input line IL and the other electrode of each of the capacitors GC3 through GC5 is connected to the drains of MOS transistors M1 and M2 in the switching unit S2 in parallel. As described above, the capacitors GC3 through GC5 store the electrical energy therein when the input receives the input voltage that is the same as the power-supply voltage VCC. The current flows from the input VIN into the capacitor GC3 through GC5 through the diode D2 and the resistor R3. Here in FIG. 4, three of the capacitors GC3 through GC5 are provided as the dying gasp capacitors, but any number of the dying gasp capacitors may be provided including a single capacitor. Moreover, capacitance of the capacitors GC3 through GC5 may be set at a variety of values depending on intended use.

The switching unit S2 performs switching operations to connect the negative side of the capacitors GC3 through GC5 to one of ground and the output node NOUT alternatively. In FIG. 4, the switching unit S2 is constituted of an N-channel MOS transistor M1 and a P-channel MOS transistor M2. The gates of the MOS transistors M1 and M2 are electrically connected to each other and constitute an input of the switching unit S2. Similarly, the drain of the N-channel MOS transistor M1 and the source of the P-channel MOS transistor M2 are both electrically connected to the negative side of the capacitors GC3 through GC5. The source of the N-channel MOS transistor M1 is connected to the output line OL (i.e., high-voltage side), and the drain of the P-channel MOS transistor M2 is connected to ground (i.e., low-voltage side). When a high-level voltage is input into the gates, the N-channel MOS transistor M1 turns on, and the negative sides of the capacitors GC3 through GC5 are electrically connected to the output line OL. In contrast, when a low-level voltage is input into the gates, the P-channel MOS transistor M2 turns on, and the negative sides of the capacitors GC3 through GC5 are electrically connected to ground.

When the input voltage is normal, the P-channel MOS transistor M2 turns on, and the switching unit S2 electrically connects the capacitors GC3 through GC5 to ground. Accordingly, when the input voltage is normal, the capacitors GC3 through GC5 store the electrical energy therein by receiving the current flowing into the capacitors GC3 through GC5 from the input VIN, and the voltages of the capacitors GC3 through GC5 are kept at the input voltage (for example, 12V). With respect to the dying gasp operation, a description is given later.

The voltage conversion unit 21 converts the input DC voltage into a predetermined value of DC output voltage (for example, 7.7 V). In the embodiment, the voltage conversion unit 21 is configured to be a step-down DC/DC converter to reduce the voltage value of the input voltage to the predetermined output voltage. The voltage conversion unit 21 includes the input node NIN, capacitors C7 and C8, resistors R4 and R5, a regulating controller 12, a diode D5, an inductor L3, a voltage dividing circuit 22, a capacitor C10, and an output node NOUT.

The input node NIN receives the input voltage from the input VIN through the diode D2 and the protection circuit, and the input voltage is the same as the power-supply voltage VCC (for example, 12V).

The capacitor C7 is a smoothing capacitor to remove noise from the input voltage, which corresponds to the capacitor C3 in FIG. 3. The capacitor C7 is inserted between the input node NIN and ground and electrically connected thereto. The input voltage is input into a voltage input terminal IN of the regulating controller 12.

The regulating controller 12 has the voltage input terminal IN, an enablement terminal EN, a switching terminal SW, a voltage feedback terminal VFB, and a ground terminal GND. The regulating controller 12 corresponds to the regulating controller 11 in FIG. 3. As described above, the voltage input terminal IN is electrically connected to the input node NIN and receives the input voltage from the input node NIN.

The enablement terminal EN receives an enable signal that permits the regulating controller 12 to operate. An RC series circuit constituted of the resistor R4 and the capacitor C8 is connected to the enablement terminal EN. More specifically, one end of the resistor R4 is electrically connected to the input node NIN and the voltage input terminal IN and the other end of the resistor R4 is connected to one electrode of the capacitor C8 and the enable terminal EN of the controller 12, and the other electrode of the capacitor C8 is electrically connected to ground.

One end of the inductor L3 is electrically connected to the switching terminal SW of the regulating controller 12, and the other end of the inductor L3 is electrically connected to the output node NOUT. The controller 12 supplies switching pulses to the inductor L3 to cause the inductor L3 to store electrical energy therein. More specifically, as described in the first embodiment, when the switching pulse is a high-level voltage, the inductor L3 stores the electrical energy therein by a current supplied from the switching terminal SW. When the switching pulse is a low-level voltage, the inductor L3 generates a back electromotive force that causes the current to continue to flow toward the output node NOUT, and a current generated by the back electromotive force flows toward the output node NOUT through the diode D5. The anode of the diode D5 is electrically connected to ground and the cathode is electrically connected to the end of the inductor L3 and the switching terminal SW.

The voltage feedback terminal VFB of the controller 12 is connected to the voltage dividing circuit 22 through the resistor R5. The voltage feedback terminal VFB detects and monitors the voltage value of the output voltage at the output node NOUT. The voltage dividing circuit includes resistors R6 and R7 connected in series to each other, and inserted between the output node NOUT and ground and electrically connected thereto. The capacitor C9 is a smoothing capacitor to remove noise from the output voltage, and is electrically connected to the resistor R6 in parallel between the output node NOUT and the voltage feedback terminal VFB of the regulating controller 12. The voltage feedback terminal VFB is electrically connected to the negative side of the capacitor C9 and the connection point between the resistors R6 and R7 through the resistor R5. The voltage feedback terminal VFB measures the divided voltage of the resistor R7, and detects the output voltage at the output node NOUT based on the divided voltage of the resistor R7. The regulating controller 12 may adjust a duty cycle of the switching pulses so that the output voltage detected through the voltage feedback terminal VFB becomes the predetermined output voltage. In the second embodiment, for example, the regulating controller 12 controls a duty cycle of the switching pulses so that the output voltage becomes 7.7V, as described above as an example.

The capacitor C10 is an output capacitor, which corresponds to the capacitor C4 in FIG. 3. The output voltage of the voltage conversion unit 21 is output from the output node and directly sent to the output of the DC/DC converter 200 through the output line OL.

When the input voltage is high enough, for example, 12V or more, the regulating controller 12 outputs the predetermined output voltage, for example, 7.7V.

The energy release controller 41 controls the dying gasp operation. As described above, the energy release controller 41 receives the divided input voltage of the resistors R1 and R2, and detects the input voltage of the DC/DC converter 200 by the voltage detection unit 32. When the input voltage is lower than a predetermined threshold voltage, the energy release controller 41 outputs a control signal indicating that the dying gasp operation should be performed. Here, the threshold voltage may be set depending on the intended use. In general, the threshold voltage is set at any value higher than the divided voltage of the lower limit of the regular range of the input voltage for stable operation. However, when starting the dying gasp operation at a late stage is enough, the threshold voltage may be set at a value lower than the divided voltage of the lower limit of the regular range of the input voltage. Thus, the threshold value to perform the dying gasp operation is set at any value depending on the intended use.

In the second embodiment, when the energy release controller 41 detects that the input voltage is lower than the predetermined threshold voltage, the energy release controller 41 outputs the control signal having a low-level voltage. In other words, the energy release controller 41 stops outputting a high-level voltage. When the input voltage is normal, the energy release controller 41 continues to output the high-level voltage to the transistor Q1 through the resistor R8, and the high-level voltage turns on the bipolar transistor Q1 because the transistor Q1 is an NPN transistor. When the transistor Q1 is turned on, the gates of the switching unit S2 receive a low-level voltage, and the capacitors GC3 through GC5 are connected to ground because the P-channel MOS transistor M2 turns on and the N-channel MOS transistor M1 turns off.

On the other hand, when the input voltage is lower than the threshold voltage, the energy release controller 41 outputs a control signal of the low-level voltage, or just stops outputting the high-level voltage (which is also called the control signal). Due to the lack of the high-level voltage, the bipolar transistor Q1 turns off. When the transistor Q1 turns off, the gates of the switching unit S2 receive a high-level voltage from NOUT, and the N-channel MOS transistor M1 turns on and the P-channel MOS transistor M2 turns off. By the switching operation, the negative sides of the capacitors GC3 through GC5 are electrically connected to the output voltage of the output node NOUT. Then, the capacitors GC3 through GC5 supply the electrical energy stored therein to the input node NIN of the voltage conversion unit 21 by supplying a current to the input node NIN through the diode D4. Because the voltage of the capacitors GC3 through GC5 are added to the output voltage, the electrical energy stored in the capacitors GC3 through GC5 can be fully used. In this manner, in the dying gasp operation, the electrical energy stored in the capacitors GC3 through GC5 can be efficiently used during the dying gasp period.

The operation of the DC/DC converter 200 of the second embodiment is similar to that of the first embodiment, and the specific operation of the components is described above. Therefore, an independent description of the operation of the DC/DC converter 200 in the second embodiment is omitted here.

Moreover, the values of the input voltage and the output voltage can be set at any values according to the intended use without respect to the specific values used in the above description.

According to the second embodiment, the electrical energy and electric charge can be efficiently used for the dying gasp operation in the practical DC/DC converter 200.

Third Embodiment

Figure 5:
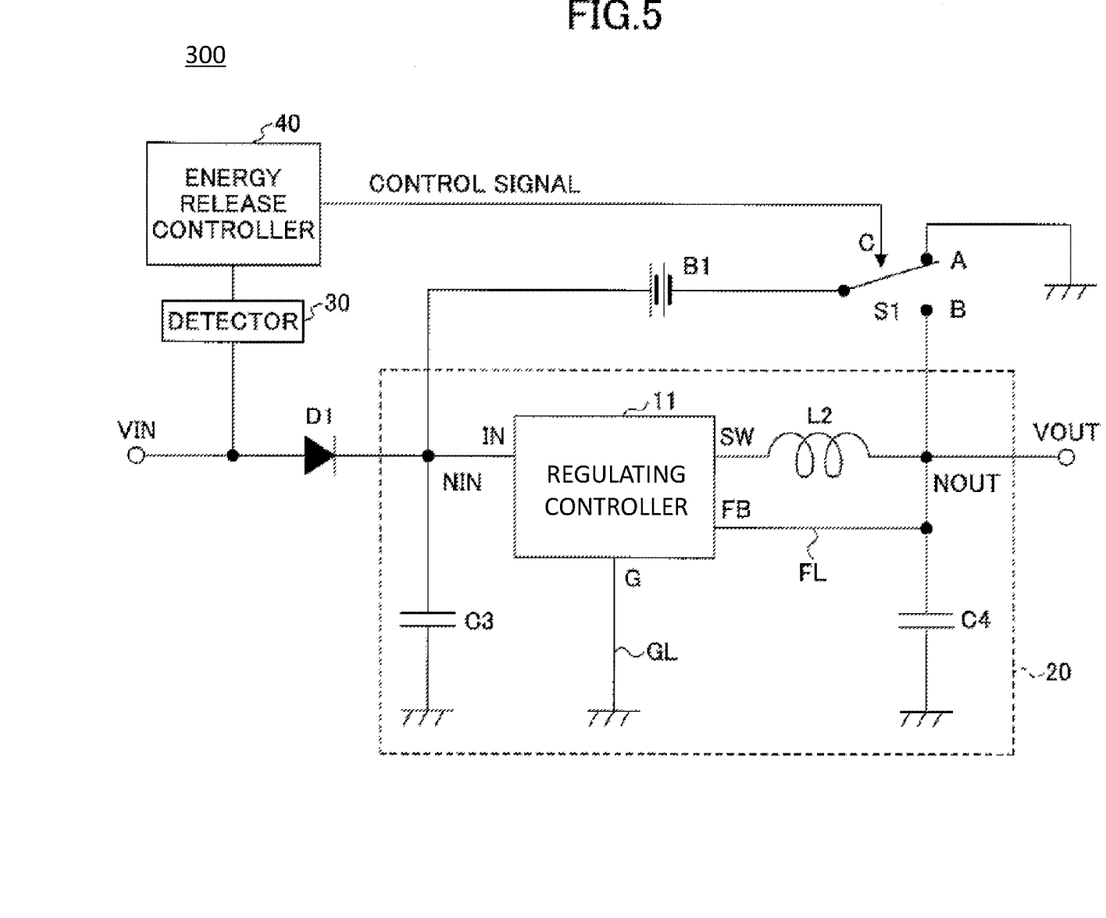
FIG. 5 is a drawing illustrating a circuit configuration of a DC/DC converter according to a third embodiment of the present invention.

FIG. 5 illustrates a DC/DC converter according to a third embodiment of the present invention.

Referring to FIG. 5, the DC/DC converter 300 according to the third embodiment differs from the first embodiment in that the capacitor GC2 is replaced with a battery B1. The positive electrode of the battery B1 is electrically connected to the input node NIN of the voltage conversion unit 20, and the negative electrode of the battery B1 is electrically connected to the switching unit S1. Since the other components and the configuration thereof are the same as the first embodiment, the same numerals are attached to the same components.

In the first and second embodiments, the capacitors GC2 through GC5 work as an electrical energy storage unit to store the electrical energy therein. However, as illustrated in FIG. 5, the dying gasp capacitor GC2 can be replaced with the battery B1. Since the battery B1 retains electrical energy from the beginning, the battery B1 in itself works as the electrical energy storage unit without performing any electrical energy storing process as described in the first and second embodiments. The dying gasp operation can be performed in the same way as described in the first embodiment. In the DC/DC converter 300 in FIG. 5, because the battery B1 can supply a current to the input node NIN of the voltage conversion unit 20 successively, the dying gasp operation can be certainly continued until the electrical load connected to the output VOUT completes the shutdown procedure.

As mentioned above, since the other components are the same as the first embodiment, the description of those is omitted.

According to the DC/DC converter 300 of the third embodiment, the dying gasp operation can be certainly continued until an electrical load finishes the shutdown procedure.

In the first through third embodiments, the description is given of the step-down DC/DC converter. However, by changing the circuit configuration of the voltage conversion unit, the embodiments of the present invention can be applied to a step-up DC/DC converter.

The DC/DC converter according to the embodiments of the present invention can use the electrical energy stored in a dying gasp capacitor efficiently for dying gasp periods.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

The invention claimed is:

1. A DC/DC converter, comprising:
   a voltage conversion unit having an input node to receive an input voltage and an output node to output an output voltage, the voltage conversion unit configured to convert the input voltage to the output voltage to output the output voltage from the output node, wherein the input voltage is higher than the output voltage;
   an electrical energy storage unit including a first electrode to be a positive electrode and a second electrode to be a negative electrode, the first electrode electrically connected to the input node of the voltage conversion converter; and
   a switching unit electrically connected to the second electrode of the electrical energy storage unit, the switching unit configured to electrically connect the second electrode of the electrical energy storage unit to one of ground and the output node of the voltage conversion unit alternatively, the switching unit configured to connect the second electrode of the electrical storage unit to the output node in order to provide a voltage equaling the output voltage plus a voltage of the electrical energy storage unit to the input node when the input voltage is lower than a threshold voltage.

2. The DC/DC converter according to claim 1, further comprising:
   an input of the DC/DC converter electrically connected to the input node to receive the input voltage before the input node receives the input voltage;
   a voltage detector electrically connected to the input of the DC/DC converter, the voltage detector configured to detect the input voltage; and
   a controller electrically connected to the voltage detector, the controller configured to control a switching operation of the switching unit based on the input voltage detected by the voltage detector.

3. The DC/DC converter according to claim 2, wherein the controller is configured to control the switching unit so as to connect the second electrode of the electrical energy storage unit to the output node of the voltage conversion unit in response to a detection signal from the voltage detector indicating that the input voltage is lower than the threshold voltage.

4. The DC/DC converter according to claim 2, further comprising:
   a diode having an anode and a cathode, the diode inserted between the input of the DC/DC converter and the input node of the voltage conversion unit, the anode electrically connected to the voltage detector and the input, the cathode electrically connected to the input node of the voltage conversion unit.

5. The DC/DC converter according to claim 2, wherein the switching unit is a semiconductor switching device.

6. The DC/DC converter according to claim 2, wherein a part of the voltage detector and the controller are integrated in a single CPU.

7. The DC/DC converter according to claim 1, wherein the electrical energy storage unit is a capacitor.

8. The DC/DC converter according to claim 1, wherein the electrical energy storage unit is a battery.

9. The DC/DC converter according to claim 1, wherein the voltage conversion unit contains an inductor whose first end is electrically connected to the output node of the voltage conversion unit, a capacitor electrically connected to the ground and the output node of the voltage conversion unit, and a regulating controller electrically connected to the input node of the voltage conversion unit, a second end of the inductor, the output node of the voltage conversion unit directly, and the ground, and the regulating controller supplies switching pulses to the inductor to output the output voltage by adjusting a duty cycle of the switching pulses.

10. A method of driving a DC/DC converter, comprising the steps of:
  outputting an output voltage to an output node of a voltage conversion unit by converting an input voltage input into an input node of the voltage conversion unit, wherein the input voltage is higher than the output voltage;
  storing electrical energy into an electrical energy storage unit connected to the input node of the voltage conversion unit and to ground through a switching unit, the switching unit being configured to electrically connect the electrical energy storage unit to one of the ground and the output node of the voltage conversion unit alternatively; and
  connecting the electrical energy storage unit to the output node of the voltage conversion unit by a switching operation of the switching unit in order to provide a voltage equaling the output voltage plus a voltage of the electrical energy storage unit to the input node when the input voltage is lower than a threshold voltage.

11. The method according to claim 10, wherein the input voltage is detected by a voltage detector, and the switching operation of the switching unit is controlled by a controller configured to output a control signal to the switching unit based on the input voltage detected by the voltage detector.

12. The method according to claim 11, wherein the switching unit includes a MOS transistor, and the connecting step is performed by providing the control signal having a high-level voltage or a low-level voltage to turn on the MOS transistor.

13. The method according to claim 10, wherein the voltage conversion unit outputs the output voltage by reducing the input voltage.

14. The method according to claim 10, wherein the electrical energy storage unit is a capacitor, and the storing step is performed by storing the electrical energy into the capacitor via a current limiting element.

15. An electronic device having a DC/DC converter, comprising:
  a voltage conversion unit having an input node to receive an input voltage and an output node to output an output voltage, the voltage conversion unit configured to convert the input voltage to the output voltage to output the output voltage from the output node, wherein the input voltage is higher than the output voltage;
  an electrical energy storage unit including a first electrode to be a positive electrode and a second electrode to be a negative electrode, the first electrode electrically connected to the input node of the voltage conversion converter; and
  a switching unit electrically connected to the second electrode of the electrical energy storage unit, the switching unit configured to electrically connect the second electrode of the electrical energy storage unit to one of ground and the output node of the voltage conversion unit alternatively, the switching unit configured to connect the second electrode of the electrical storage unit to the output node in order to provide a voltage equaling the output voltage plus a voltage of the electrical energy storage unit to the input node when the input voltage is lower than a threshold voltage.

* * * * *